of Patent Office 2,992,238
Patented July 11, 1961

2,992,238
VAPOR PHASE PREPARATION OF STYRENE OXIDE
Stanley D. Zimmerman, Lake Charles, La., assignor to The Dow Chemical Company, Midland, Mich., a corporation of Delaware
No Drawing. Filed Mar. 20, 1959, Ser. No. 800,614
2 Claims. (Cl. 260—348.5)

This invention concerns a process for the catalytic oxidation of styrene with an oxygen-containing gas to form the corresponding oxide. More particularly, it concerns the catalyzed oxidation of styrene with an oxygen-containing gas to form styrene oxide, in which a supported silver catalyst is used.

It is well known that ethylene can be oxidized directly to ethylene oxide with silver catalysis and the use of inhibitors to minimize complete combustion. Attempts to make higher epoxides by this method have been unsuccessful. As pointed out by an eminent authority on the oxidation of olefins, Chemical and Engineering News 34:2064 (April 23, 1956), all attempts to find a catalyst that would allow direct oxidation of higher olefins to epoxide in the same manner that silver catalyst works for ethylene led to failure, so far as was known then.

It was most surprising, therefore, to find that a particular type of supported silver catalyst could be utilized in the direct oxidation of styrene with an oxygen-containing gas, advantageously air, to give styrene oxide.

The supported silver catalysts useful in the instant invention are prepared by a novel reduction process in which a polyhydric alcohol compound is used both as a reductant and as an agent for promoting adhesion between the molecular silver and the support upon which it is deposited. The process involves reduction at an elevated temperature of at least one reducible silver compound of the group including silver oxide, silver carbonate, and silver oxalate, in the presence of a conventional particulate support by a polyhydric alcohol compound. By "polyhydric alcohol compound" is meant at least one member of the group of liquid glycols such as ethylene, propylene, and butylene glycols and their aqueous solutions; glycerol; aqueous sugar solutions; aqueous polyvinyl alcohol solutions; polyglycols such as polyethylene and polypropylene glycols, including aqueous solutions thereof; water-soluble glycol alkyl ethers and their aqueous solutions; water-soluble polyglycol alkyl ethers and their aqueous solutions; and the like. When aqueous solutions are used, a concentration of at least 25 percent active ingredient is needed. The amount of polyhydric alcohol compound used ranges between that amount needed to form a monomolecular film on the silver compound particles, and promoter when added, as well as on the particles of the support or substrate, up to the amount which is absorbed and retained by them after gravity drainage, hereinafter to be designated as "amount sufficient to wet" or "polyhydric alcohol-compound wetted" support, silver compound (and promoter when used). The silver compound is reduced by the polyhydric alcohol compound, and volatile products of reaction are evaporated upon being heated to a temperature ranging between 110° and 200° C. The heating is advantageously carried out in stages, e.g., from 110° to 140° C. to reduce the silver compound and from 140° to 200° C. to vaporize volatile products of reaction. Thereafter, the finished catalyst can be heat treated, as desired, to bring it to a desired level of activity, a known catalytic expedient, advantageously by heating at about 400° C. Another means of controlling the activity or selectivity of such supported silver catalyst is to incorporate one or more promoting agents, such as sodium oxide, barium oxide, gold chloride, stannous oxide, etc. therewith. Conventional catalyst supports or substrates such as fused alumina, zirconia, corundum, mullite and the like can be used. Alumina is preferred.

The catalysts useful in this invention can be prepared in various ways, as follows. The silver compound and the particulate support can be mixed dry, and liquid or vaporized polyhydric alcohol compound introduced in amount sufficient to wet the solids while being mixed. Or the particulate support can be soaked in the polyhydric alcohol compound, allowed to drain, and then mixed with silver compound so that all the solids are wetted by the polyhydric alcohol compound. Again, a slurry of silver compound and polyhydric alcohol compound can be prepared in amount sufficient to wet the support, advantageously an absorptive support, which is then mixed into or dipped into the slurry, then gravity drained. In each case, the reaction mixture is thereafter heated, as indicated, to reduce the silver compound and to volatilize the vaporous reaction products. The proportion of silver compound to support is varied so as to deposit a burden of between 0.5 and 20 percent by weight of silver, finished catalyst basis.

Reduction of the silver compound may be carried out in various ways, such as by heating the polyhydric alcohol compound-wetted mass in an oven or with infrared lamps or in an open pan at temperatures between 110° and 140° C. for a time sufficient to reduce the silver compound. Thereafter the material is heated between 140° and 200° C. to remove volatiles, advantageously in an air-purged oven or by igniting the volatile reaction products when open pan heating is used. Such finished catalyst may be subjected to a subsequent heat treatment at 400° C. and above when it is desired to adjust catalyst activity.

In practice, styrene is fed through a catalyst packed reactor in a stream of gas containing molecular oxygen and between 0.5 and 15 percent by weight of styrene, the reaction temperature being maintained at temperatures between 200° and 350° C., preferably between 250° and 300° C. When the temperature is lower than 200° C., little or no reaction takes place, while when the temperature is higher than 350° C., most of the styrene is oxidized to water and carbon dioxide. Space velocities are varied to give useful conversions and yields, advantageously between about 500 and about 1100 volumes of gas containing styrene and molecular oxygen per volume of catalyst per minute. At space velocities lower than about 500, the tendency is increasingly to oxidize the styrene further than to the oxide, while at space velocities higher than about 1100, conversions are usually impracticably low. Condensable organic material is separated from the effluent gas and distilled under reduced pressure to recover styrene oxide product.

The following examples represent specific embodiments of this invention and advantages accruing from its practice.

EXAMPLE 1

Air, purified by passage through a train of 20 percent sodium hydroxide and beds of anhydrous calcium sulfate and silica gel and containing vaporized commercial grade styrene (containing 6 p.p.m. of tertiary butyl catechol) in varying amounts, was passed over a heated catalyst prepared by the process indicated above, containing 6.5 percent silver and 0.5 percent tin promoted with a small amount of calcium oxide and supported on a fused alumina having a bulk density of 116 lbs./cu. ft. The space velocity of the styrene-air mixture over the catalyst was 575. Condensable organic material and water in the effluent gas were collected in cold traps immersed in solid carbon dioxide and acetone. The oily product was separated from water, weighed, distilled under reduced pressure, and the fraction boiling at 45° C. (2 mm. Hg) was collected. It contained an average of 85.5 percent of styrene oxide, as determined by infra-red analysis. The styrene oxide is purified by repeated distillation under reduced pressure. The following results per single pass were obtained.

*Table I*

| Catalyst temperature ° C. | Percent styrene in feed | Percent conversion of styrene | Percent yield of styrene oxide |
|---|---|---|---|
| 289 | 4.9 | 12.5 | 63.7 |
| 290 | 4.9 | 14.0 | 62.9 |
| 292 | 5.3 | 12.4 | 62.6 |
| 296 | 8.6 | 8.4 | 67.7 |

The trace amount of tertiary butyl catechol inhibitor can be removed from the styrene, if desired. It has no substantial effect on conversion or yield.

EXAMPLE 2

The procedure of Example 1 was repeated at a space velocity of 600, using a 2 percent silver catalyst supported on fused alumina and promoted with trace amounts of silver chloride, prepared according to the procedure indicated above. The following results were obtained.

*Table II*

| Catalyst temperature, ° C. | Percent of styrene in feed | Percent conversion of styrene | Percent yield of styrene oxide |
|---|---|---|---|
| 306 | 4.9 | 11.6 | 62.7 |
| 310 | 8.2 | 8.2 | 74.2 |
| 310 | 8.5 | 6.6 | 82.0 |

EXAMPLE 3

The procedure of Example 2 was repeated using a 6.5 percent silver catalyst, promoted with trace amounts of sodium hydroxide and stannous oxide, supported on fused alumina, prepared according to the procedure indicated above. The following results were obtained.

*Table III*

| Catalyst temperature ° C. | Percent styrene in feed | Percent conversion of styrene | Percent yield of styrene oxide |
|---|---|---|---|
| 270–272 | 5.5 | 19.9 | 57.4 |
| 265 | 3.8 | 21.3 | 52.8 |
| 266 | 8.3 | 12.7 | 73.8 |

EXAMPLE 4

Fused aluminas of the types indicated in the following table were mixed with aqueous 25 weight percent diethylene glycol, with silver oxalate sufficient to give the indicated silver burden and with promoters as indicated, the amount of aqueous diethylene glycol being sufficient to wet the catalyst ingredients. The wet mixes were dried and reduced by heating slowly to 225° to 285° C. for 30–45 minutes. The catalysts were then ready for use. Results are given in following Table IV wherein variations in bed packing are indicated.

*Table IV*

| | Fused alumina | Catalyst percent Ag | Promoter | Feed percent styrene (bal. air) | Space velocity | Percent conv. | Temp. ° C. | Yield [1] |
|---|---|---|---|---|---|---|---|---|
| 1. | 8–14 mesh | 2 | None | 5 | 576 | 8.2 | 284–290 | 54.2 |
| 2. | Do | 2 | Silver perchlorate | 5.1 | 577 | 12.5 | 292–302 | 65 |
| 3. | Do | 6 | Gold chloride | 4.2 | 572 | 9.4 | 284–291 | 71.5 |
| 4. | Do | 6.5 | 5% Cu as Cu₂O | 7.6 | 593 | 7.4 | 248–60 | 79.6 |
| 5. | Do.[2] | 6.9 | 0.1% Sn as SnO | 6.4 | 720 | 13.4 | 282 | 72 |
| 6. | Do.[2] | 6.9 | do | 6.1 | 1,100 | 11.6 | 282 | 73.6 |
| 7. | Do.[3] | 2.5 | do | 8.9 | 960 | 10.3 | 280 | 83 |
| 8. | Do.[3] | 2.5 | do | 8.5 | 960 | 12.5 | 280 | 85 |
| 9. | Do.[3] | 6 | None | 10.0 | 960 | 3 | 280 | 58.2 |
| 10. | Do.[3] | 6 | do | 10.2 | 960 | 4.1 | 286 | 42.2 |
| 11. | Do.[3] | 6 | 0.1% Ca as CaO | 7.8 | 600 | 5.2 | 265 | 53.2 |
| 12. | Do.[3] | 6 | do | 7.8 | 600 | 9.2 | 280 | 47.0 |
| 13. | Do | 4 | 0.1% Ba as BaCO₃, 0.1% Sn as SnO | 8.4 | 960 | 12.1 | 304 | 82.4 |
| 14. | Do | 4 | 0.1% Zn as Zn, 0.1% Sn as SnO | 6.4 | 960 | 8.7 | 285 | 65.5 |
| 15. | Do | 4 | 0.1% Ce as CeO₂ | 8.0 | 960 | 10.0 | 299 | 73.1 |
| 16. | Do | 4 | 0.1% mixed rare earth oxides | 12.0 | 960 | 8.6 | 300 | 75.5 |
| 17. | Do | 4 | 0.1% mixed rare earth carbonates | 7.4 | 960 | 8.2 | 302 | 63.2 |

[1] Yield based on percent conversion of styrene to styrene oxide.
[2] Bed was packed top ⅓ 2/1=unburdened support/burdened support, middle ⅓ 1/1=unburdened support/burdened support, bottom ⅓ entirely burdened support.
[3] Bed was packed top ¼ burdened support, middle ¾ unburdened support, bottom ¼ burdened support.

This application is a continuation-in-part of application U.S. Serial No. 620,597 filed November 6, 1956, now abandoned.

What is claimed is:

1. A method for manufacturing styrene oxide which comprises reacting at a temperature between 200° and 350° C. and a space velocity between about 500 and about 1100 volumes per minute of a gaseous mixture containing excess molecular oxygen and between 0.5 and 15 percent by weight of styrene per volume of a supported silver catalyst which has been prepared by heating a polyhydric alcohol-compound wetted mixture comprising a conventional particulate inert catalyst support and at least one reducible silver compound of the group consisting of silver oxide, silver carbonate and silver oxalate to a reaction temperature between 110° C. and 200° C. for a time sufficient to reduce the silver compound to metallic silver and to vaporize volatile reaction products, and recovering styrene oxide product.

2. The method of claim 1, wherein the silver catalyst is promoted with at least one promoter of the group consisting of tin, zinc, calcium oxide, silver chloride, silver perchlorate, sodium hydroxide, stannous oxide, cuprous oxide, gold chloride, barium carbonate, ceric oxide, mixed rare earth oxides and mixed rare earth carbonates.

No references cited.